(12) United States Patent
Dooley et al.

(10) Patent No.: US 7,545,056 B2
(45) Date of Patent: Jun. 9, 2009

(54) SATURATION CONTROL OF ELECTRIC MACHINE

(75) Inventors: Kevin Allan Dooley, Mississauga (CA); Joshua David Bell, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 397 days.

(21) Appl. No.: 11/420,614

(22) Filed: May 26, 2006

(65) Prior Publication Data
US 2006/0226721 A1   Oct. 12, 2006

Related U.S. Application Data

(63) Continuation-in-part of application No. 10/996,411, filed on Nov. 26, 2004, now Pat. No. 7,262,539, which is a continuation of application No. 10/444,952, filed on May 27, 2003, now Pat. No. 6,965,183.

(51) Int. Cl.
*H02J 3/38* (2006.01)
*H02J 3/46* (2006.01)
*H02P 5/00* (2006.01)
*H02P 5/74* (2006.01)
*H02H 7/06* (2006.01)

(52) U.S. Cl. .................. 307/84; 318/495; 307/153; 361/20; 361/23; 310/112; 310/180; 322/22

(58) Field of Classification Search .............. 310/184, 310/113, 180, 187, 254; 322/57, 90, 63, 322/66, 89, 93; 307/52, 84, 153; 318/495, 318/498, 500, 503, 504, 508, 509, 511, 512, 318/513

See application file for complete search history.

(56) References Cited

U.S. PATENT DOCUMENTS

| 1,685,970 | A | 10/1928 | Townend et al. |
| 1,723,090 | A | 8/1929 | Stevenson, Jr. |
| 2,291,008 | A | 7/1942 | Tyrner |
| 2,564,320 | A | 8/1951 | Brainard |
| 2,886,762 | A | 5/1959 | Polasek |
| 2,939,069 | A | 5/1960 | Dvoracek |
| 3,243,688 | A | 3/1966 | Brundage |
| 3,344,338 | A | 9/1967 | Sparrow |

(Continued)

FOREIGN PATENT DOCUMENTS

CA    2051626    8/1991

(Continued)

OTHER PUBLICATIONS

General Electric Company, "150Kva Samarium Cobalt VSCF Starter/Generator Electrical System, Final Technical Report", 1979.

(Continued)

*Primary Examiner*—Burton Mullins
(74) *Attorney, Agent, or Firm*—Ogilvy Renault LLP; Todd D. Bailey

(57) ABSTRACT

The invention includes an electric alternator/motor having a rotor, stator and at least one winding in the stator adapted to conduct a current, the machine also having and first and second magnetic circuits, one of which includes a saturable portion in which saturation may be controlled to permit control of the machine.

7 Claims, 11 Drawing Sheets

U.S. PATENT DOCUMENTS

| | | | |
|---|---|---|---|
| 3,671,788 A | 6/1972 | Knudson et al. |
| 3,707,638 A | 12/1972 | Nailen |
| 3,753,068 A | 8/1973 | Walker, Jr. |
| 3,812,441 A | 5/1974 | Sakamoto et al. |
| 3,866,110 A | 2/1975 | Ruggeri |
| 3,961,211 A | 6/1976 | Vergues |
| 3,986,062 A | 10/1976 | Morrill |
| 4,004,202 A | 1/1977 | Davis |
| 4,032,807 A | 6/1977 | Richter |
| 4,039,910 A | 8/1977 | Chirgwin |
| 4,138,629 A | 2/1979 | Miller et al. |
| 4,237,395 A | 12/1980 | Loudermilk |
| 4,250,128 A | 2/1981 | Meckling |
| 4,305,031 A | 12/1981 | Wharton |
| 4,346,335 A | 8/1982 | McInnis |
| 4,392,072 A | 7/1983 | Rosenberry |
| 4,401,906 A | 8/1983 | Isobe et al. |
| 4,445,061 A | 4/1984 | Jackson, Jr. |
| 4,492,902 A | 1/1985 | Ficken et al. |
| 4,503,377 A | 3/1985 | Kitabayashi et al. |
| 4,511,831 A | 4/1985 | McInnis |
| 4,547,713 A | 10/1985 | Langley et al. |
| 4,562,399 A | 12/1985 | Fisher |
| 4,605,874 A | 8/1986 | Whiteley |
| 4,617,726 A | 10/1986 | Denk |
| 4,625,135 A | 11/1986 | Kasabian |
| 4,638,201 A | 1/1987 | Feigel |
| 4,656,379 A | 4/1987 | McCarty |
| 4,709,180 A | 11/1987 | Denk |
| 4,713,570 A | 12/1987 | Mastromattei |
| 4,763,034 A | 8/1988 | Gamble |
| 4,799,578 A | 1/1989 | Matsushita |
| 4,851,758 A | 7/1989 | Osada et al. |
| 4,852,245 A | 8/1989 | Denk |
| 4,887,020 A | 12/1989 | Graham |
| 4,896,756 A | 1/1990 | Matsushita |
| 4,897,570 A | 1/1990 | Ishikawa et al. |
| 4,924,125 A | 5/1990 | Clark |
| 5,030,877 A | 7/1991 | Denk |
| 5,184,040 A | 2/1993 | Lim |
| 5,235,231 A | 8/1993 | Hisey |
| 5,245,238 A | 9/1993 | Lynch et al. |
| 5,260,642 A | 11/1993 | Huss |
| 5,304,883 A | 4/1994 | Denk |
| 5,397,948 A | 3/1995 | Zoerner et al. |
| 5,519,275 A | 5/1996 | Scott et al. |
| 5,555,722 A | 9/1996 | Mehr-Ayin et al. |
| 5,585,682 A | 12/1996 | Konicek et al. |
| 5,742,106 A | 4/1998 | Muraji |
| 5,770,901 A | 6/1998 | Niimi et al. |
| 5,793,137 A | 8/1998 | Smith |
| 5,798,596 A | 8/1998 | Lordo |
| 5,822,150 A | 10/1998 | Kelsic |
| 5,825,597 A | 10/1998 | Young |
| 5,834,874 A | 11/1998 | Krueger et al. |
| 5,838,080 A | 11/1998 | Couderchon et al. |
| 5,903,115 A | 5/1999 | Taylor |
| 5,912,522 A | 6/1999 | Rivera |
| 5,917,248 A | 6/1999 | Seguchi et al. |
| 5,925,999 A | 7/1999 | Lakerdas et al. |
| 5,936,325 A | 8/1999 | Permuy |
| 5,942,829 A | 8/1999 | Huynh |
| 5,952,757 A | 9/1999 | Boyd, Jr. |
| 5,953,491 A | 9/1999 | Sears et al. |
| 5,955,809 A | 9/1999 | Shah |
| 5,962,938 A | 10/1999 | Bobay et al. |
| 6,011,338 A | 1/2000 | Bell et al. |
| 6,097,124 A | 8/2000 | Rao et al. |
| 6,100,620 A | 8/2000 | Radovsky |
| 6,114,784 A | 9/2000 | Nakano |
| 6,154,019 A | 11/2000 | Valdemarsson et al. |
| 6,239,532 B1 | 5/2001 | Hollenbeck et al. |
| 6,242,840 B1 | 6/2001 | Kenk et al. |
| 6,255,756 B1 | 7/2001 | Richter |
| 6,271,613 B1 | 8/2001 | Akemakou et al. |
| 6,286,199 B1 | 9/2001 | Bobay et al. |
| 6,313,560 B1 | 11/2001 | Dooley |
| 6,323,625 B1 | 11/2001 | Bhargava |
| 6,342,746 B1 | 1/2002 | Flynn |
| 6,373,162 B1 | 4/2002 | Liang et al. |
| 6,429,615 B2 | 8/2002 | Schmider et al. |
| 6,437,529 B1 | 8/2002 | Brown |
| 6,504,261 B2 | 1/2003 | Fogarty et al. |
| 6,525,504 B1 | 2/2003 | Nygren et al. |
| 6,541,887 B2 | 4/2003 | Kawamura |
| 6,781,331 B2 | 8/2004 | Mokri et al. |
| 6,965,183 B2 | 11/2005 | Dooley |
| 7,126,313 B2 | 10/2006 | Dooley |
| 2002/0047455 A1 | 4/2002 | Dhyanchand et al. |
| 2002/0084705 A1 | 7/2002 | Kawamura |
| 2002/0084715 A1 | 7/2002 | Kakuta et al. |
| 2002/0093252 A1 | 7/2002 | Kang et al. |
| 2002/0149281 A1 | 10/2002 | Saint-Michel et al. |
| 2004/0183392 A1 | 9/2004 | Dooley |
| 2004/0239202 A1 | 12/2004 | Dooley |
| 2005/0146307 A1 | 7/2005 | Dooley et al. |
| 2006/0113967 A1 | 6/2006 | Dooley |
| 2007/0024249 A1 | 2/2007 | Dooley |

FOREIGN PATENT DOCUMENTS

| | | |
|---|---|---|
| DE | 3430590 A1 | 2/1986 |
| DE | 3430188 | 8/1989 |
| EP | 368930 | 4/1994 |
| EP | 754365 | 2/1998 |
| EP | 750806 | 8/1998 |
| EP | 0909010 * | 4/1999 |
| EP | 1 235 327 A2 | 8/2002 |
| EP | 1 235 327 A3 | 8/2002 |
| FR | 1555855 | 12/1968 |
| FR | 2618616 | 7/1987 |
| GB | 2 184 609 A | 6/1987 |
| JP | 55-061625 | 5/1980 |
| JP | 1-138936 | 5/1989 |
| JP | 1-138938 | 5/1989 |
| JP | 6 237 561 | 8/1994 |
| JP | 7 039122 | 2/1995 |
| JP | 7 075213 | 3/1995 |
| JP | 9 205743 | 8/1997 |
| JP | 2001-16887 | 1/2001 |
| JP | 2002-191158 | 7/2002 |
| JP | 2002-291216 | 10/2002 |
| JP | 2003-102159 | 4/2003 |
| WO | WO 90/10971 | 9/1990 |
| WO | WO 91-12647 | 8/1991 |
| WO | 99/09638 | 2/1999 |
| WO | 99/66624 | 12/1999 |
| WO | 02/09260 | 1/2002 |
| WO | 03/003546 | 1/2003 |
| WO | WO 03/023939 | 3/2003 |
| WO | 03/028202 | 4/2003 |

OTHER PUBLICATIONS

M. Cronin, "The All-Electric Airplane as Energy Efficient Transport", SAE Journal, 1980.

Richter, E. et al., "Jet Engine Integrated Generator", Amcn Inst. Aeronautics & Astronautics, 1981.

B. Dishner et al., "A Novel Electromechanical Approach to Constant Frequency Power Generation", IEEE Journal, 1989.

M. Cronin, "The All-Electric Airplane Revisited", SAE Technical Series, 1989.

SAE Technical Paper Series 892252, Application Considerations for Integral Gas Turbine Electric Starter/Generator revisited. 1989.

The Applicability of Electrically Driven Accessories for Turboshaft Engines, 1993.

R. Nims, "Development of an Oilless, Gearless, and Bleedable under Armour Power Unit", ASME paper, 1995.

Richter et al., "Preliminary Design of an Internal Starter/Generator for Aplication in the F110-129 Engine", SAE Aerospace Atlantic Conference, 1995.

R. Nims, "Armor-plated auxiliary power", Mechanical Enginering, 1997.

PCT International Search Report for International application No. PCT/CA2004/000689 mailed Sep. 16, 2004.

Kevin Allan Dooley, "Saturation control of electric machine", U.S. Appl. No. 10/996,411, filed Nov. 26, 2004.

International Search Report PCT/CA2005/001657, Feb. 22, 2006.

U.S. Appl. No. 11/379,620, filed Apr. 21, 2006, by Kevin Allan Dooley.

U.S. Appl. No. 11/420,602, filed May 26, 2006, by Kevin Allan Dooley.

U.S. Appl. No. 11/533,548, filed Sep. 20, 2006, by Kevin Allan Dooley.

* cited by examiner

US 7,545,056 B2

SATURATION CONTROL OF ELECTRIC MACHINE

CROSS REFERENCE TO EARLIER APPLICATION

This application is a continuation-in-part of applicant's U.S. patent application Ser. No. 10/996,411, filed Nov. 26, 2004 now U.S. Pat. No. 7,262,539 which is itself a continuation of U.S. patent application Ser. No. 10/444,952, filed May 27, 2003 now U.S. Pat. No. 6,965,183, the contents of which are incorporated by reference into this application.

TECHNICAL FIELD

The invention relates to electric machines such as alternators and motors and in particular to the control of such machines

BACKGROUND OF THE ART

Referring to FIG. 1, a typical permanent magnet (PM) alternator or motor has a rotor 102 supporting permanent magnets 104 and mounted on a rotatable shaft 108. A stator 110 has a plurality of windings 112 between a plurality of teeth 114 mounted to a back iron 116. (For ease of illustration, the adjacent elements of windings 112 in FIG. 1 are shown unconnected.) When operated in an alternator mode, an external torque source forces rotation of the shaft, and the interaction of the magnets and the windings causes a magnetic flux to loop the windings in the slots. As magnetic flux varies due to rotor rotation, voltage is generated in windings 112, which results in an output current when a load is connected to the output of the machine. When operated in a motor mode, voltage from an external source (not shown) is applied to windings 112, and the resulting current induces magnetic flux in the stator and rotor which, when appropriately controlled, causes the rotor to rotate to produce torque. PM machines can have an "inside rotor" configuration as shown in FIG. 1 or an "outside rotor" configuration (not shown).

The output voltage and frequency of prior art PM alternators is determined by rotor speed, which present challenges where rotor speed cannot be independently controlled. It would therefore be desirable to improve the controllability of electric machines, generally, and in particular PM machines.

SUMMARY OF THE INVENTION

In one aspect, the present invention provides an electric machine operable as at least one of an electric alternator/generator and an electric motor, the machine having a rotor and a stator, the stator assembly including at least a stator electrical winding, the machine comprising a first magnetic circuit defined in the rotor and stator and encircling at least a first portion of the first winding a second magnetic circuit defined in the stator assembly and encircling at least a second portion of the first winding, the second magnetic circuit remote from the first magnetic circuit and including a portion which is magnetically saturable, and a saturation control apparatus adapted to controllably varying a saturation level of said saturable portion.

In another aspect, the invention provides a method of regulating operation of an electrical machine, the method involving at least one electric machine having a magnetic rotor, a stator and at least one stator winding, the winding associated with a primary magnetic circuit defined by the rotor and stator, the winding also associated with a secondary magnetic circuit defined in the stator, the secondary magnetic circuit remote from the first magnetic circuit and including a magnetically saturable portion, the method comprising the steps of operating the machine to provide at least one of generated output electrical power in the winding and motive power as a result of current supplied to the winding, and controllably varying a saturation level of a portion of the secondary magnetic circuit to thereby control operation of the machine.

Still other inventions and aspects are disclosed in this specification and attached figures, as well, and the present application claims all such inventions.

BRIEF DESCRIPTION OF THE DRAWINGS

For a better understanding of the present invention and to show more clearly how it may be carried into effect, reference will now be made by way of example to the accompanying drawings, showing articles made according to preferred embodiments of the present invention, in which.

DESCRIPTION OF THE PREFERRED EMBODIMENTS

Figure 1:
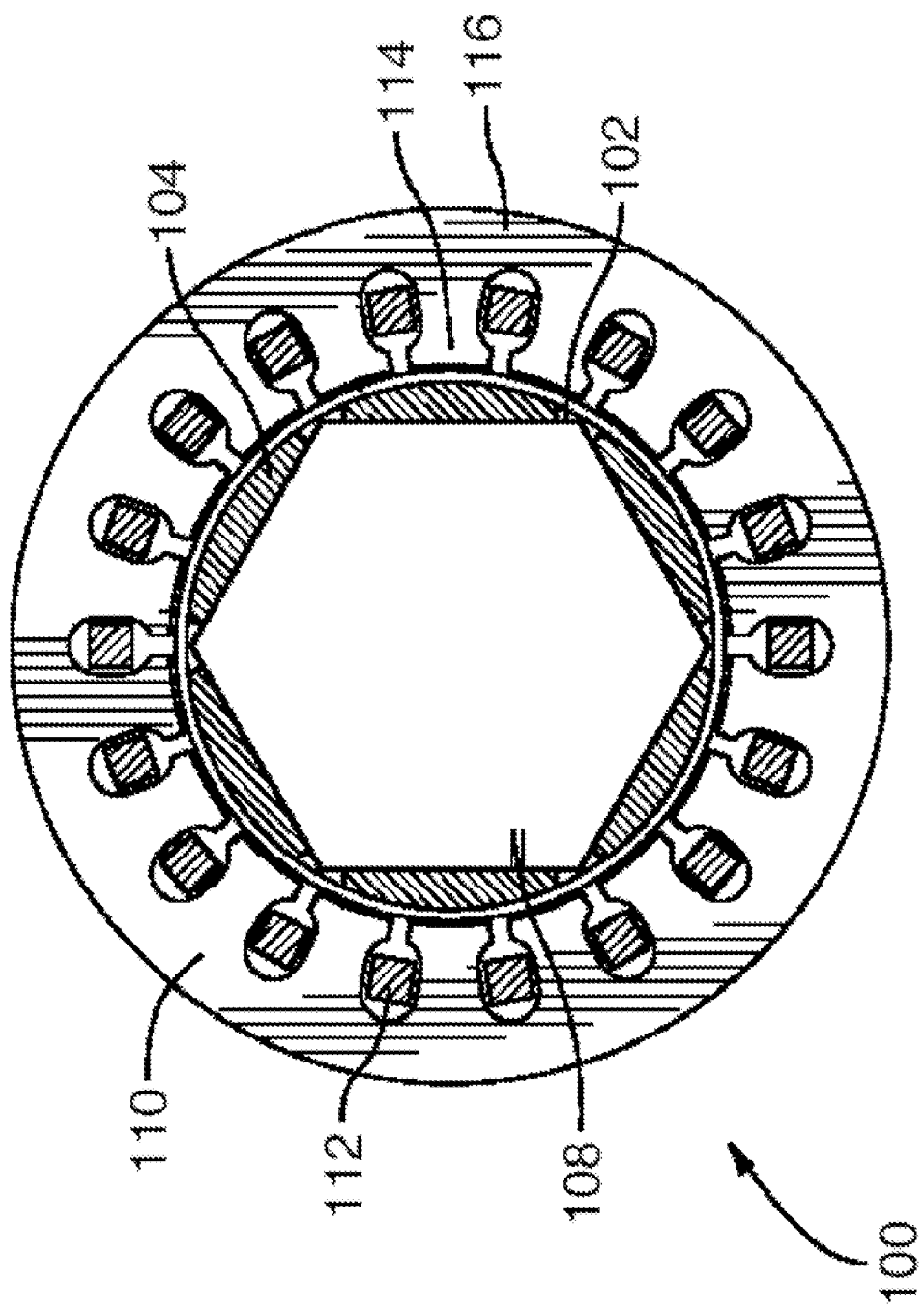
FIG. 1 is a somewhat schematic cross-sectional view of a prior art permanent magnet alternator/motor.
Figure 2:
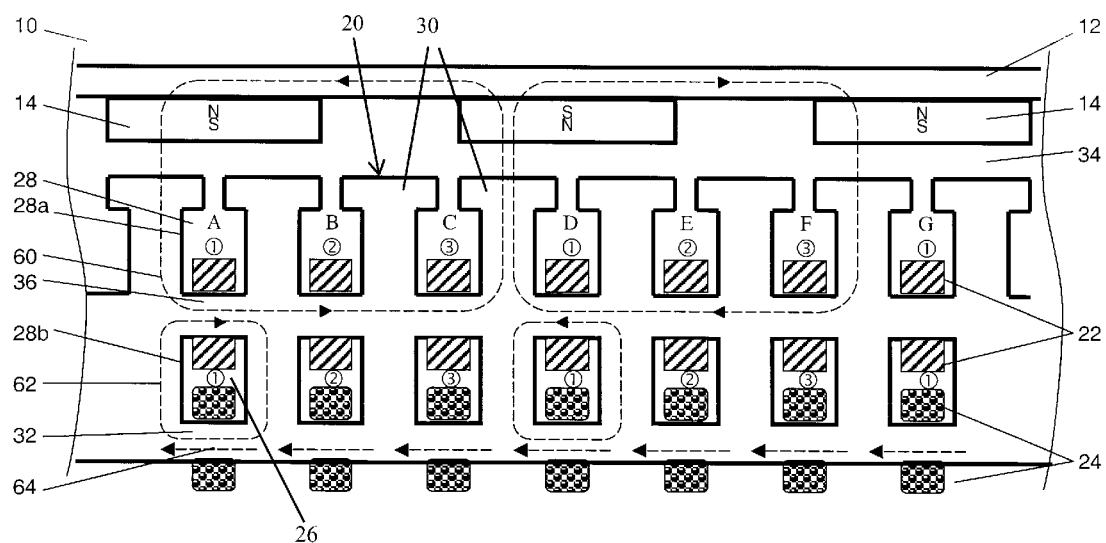
FIG. 2 is somewhat schematic partial cross-sectional view of a alternator/motor according to the present invention.

Referring to FIG. 2, a portion of a permanent magnet (PM) electric machine according to the present invention is depicted in at 10. For ease of illustration and description, FIG. 2 shows a linear arrangement of the electric machine 10, however it is to be understood that the machine is generally preferred to have a circular architecture, with an inside or outside rotor. It will also be understood by the skilled reader that FIG. 2 and the accompanying description are schematic in nature, and that many routine details of the design have been omitted for clarity. The machine 10 may be configured as an alternator to generate electrical power, or motor to convert electrical power into mechanical torque, or both. The description below is directed to an electric machine operable as both and alternator and motor.

Alternator/motor 10 has a rotor 12 with permanent magnets 14 which is mounted for rotation relative to a stator 20. Stator 20 has at least one power winding 22 and preferably at least one control winding 24, and this embodiment stator 20 has a 3-phase design with three electromagnetically-independent power windings 22 (the phases are denoted by the circled numerals 1, 2, 3, respectively) and, correspondingly, three independent control windings 24. The power and control windings are separated in this embodiment by a winding air gap 26 and disposed in radial slots 28 between a plurality of adjacent teeth 30. (For ease of illustration in FIG. 2, the adjacent elements of control winding 24 are shown unconnected. For ease of description, the adjacent slots 28 are indicated as A, B, C, D etc.) Power winding 22 and control winding 24 are electrically Isolated from one another. A back iron 32, or control flux bus as it is described in this application, extends between slots 28. A rotor air gap 34 separates rotor 12 and stator 20 in a typical fashion. A core or "bridge" portion or "power flux bus" 36 portion of stator also extends between adjacent pairs of teeth 30 between adjacent portions of power winding 22.

The materials for PM machine 10 may be any deemed suitable by the designer. Materials preferred by the inventor are: samarium cobalt permanent magnets, copper power and control windings, a suitable saturable electromagnetic material for the stator teeth such as electrical silicon steels commonly used in the construction of magnetic machines, power and control flux busses. The stator teeth, power and control flux busses may be integral or non-integral with one another, as desired. The designer will select the rotor and stator dimensions and materials based at least in part on the desired properties of the magnetic circuits (described below) in the machine to yield the desired machine performance, etc. The control flux bus 32 is magnetically saturable, as will be described below.

Power winding 22 in this embodiment consists of a single conductor which enters slot 28 on a first side of power flux bus 36, crosses power flux bus 36 at the other end and exits slot 28 on the second or other side of power flux bus 36 (i.e. opposite to the first side, or side of entry) and proceeds to a next slot 28 of the same phase, where the power winding 22 preferably enters this next slot from the second side of power flux bus 36 instead of the first side, as described above. The winding of power winding 22 is preferably similar to that described in the applicants U.S. Pat. No. 6,965,183.

Meanwhile, control winding 24 is wrapped around the control flux bus, in this embodiment preferably multiple times, such as 25 times, for reasons described below. The direction of winding between adjacent appropriate slots (i.e. appropriate to maintain phase correspondence with the power winding) is preferably the same from slot to slot, and thus alternatingly opposite relative to the power winding 22 and in equal numbers of slots, so that a net-zero voltage is induced in the control winding, as will also be described further below. Control winding 24 is connected to a current source and control system 50 (see FIG. 3), which in this example includes a variable current DC source and an appropriate solid state control system preferably having functionality as described further below. The current provided by such source is preferably sufficient to saturate control bus 32, as will be described. Note that the control winding 24 does not necessarily need to be segregated into phases along with the power windings, but rather may simply proceed adjacently from slot to slot (e.g. slots A, B, C, D, etc.). Alternately, though not segregated into phase correspondence with power windings 22, it may be desirable to provide multiple control windings, for example, to reduce inductance and thereby improve response time in certain situations, Preferably, several control windings 24 are provided in a series-parallel arrangement, meaning the control windings 24 of several slots are connected in series, and several such windings are then connected in parallel to provide the complete control winding assembly for the machine. Although it is preferred to alternate winding direction of the power windings, and not alternate direction of the control windings as mentioned the power and control windings are preferably wound in relative opposite directions and in equal slot numbers to ensure a substantially net-zero voltage is induced in each control winding 24 as a result of current flow in the power windings 22, so that the function described below is achieved.

Figure 3:
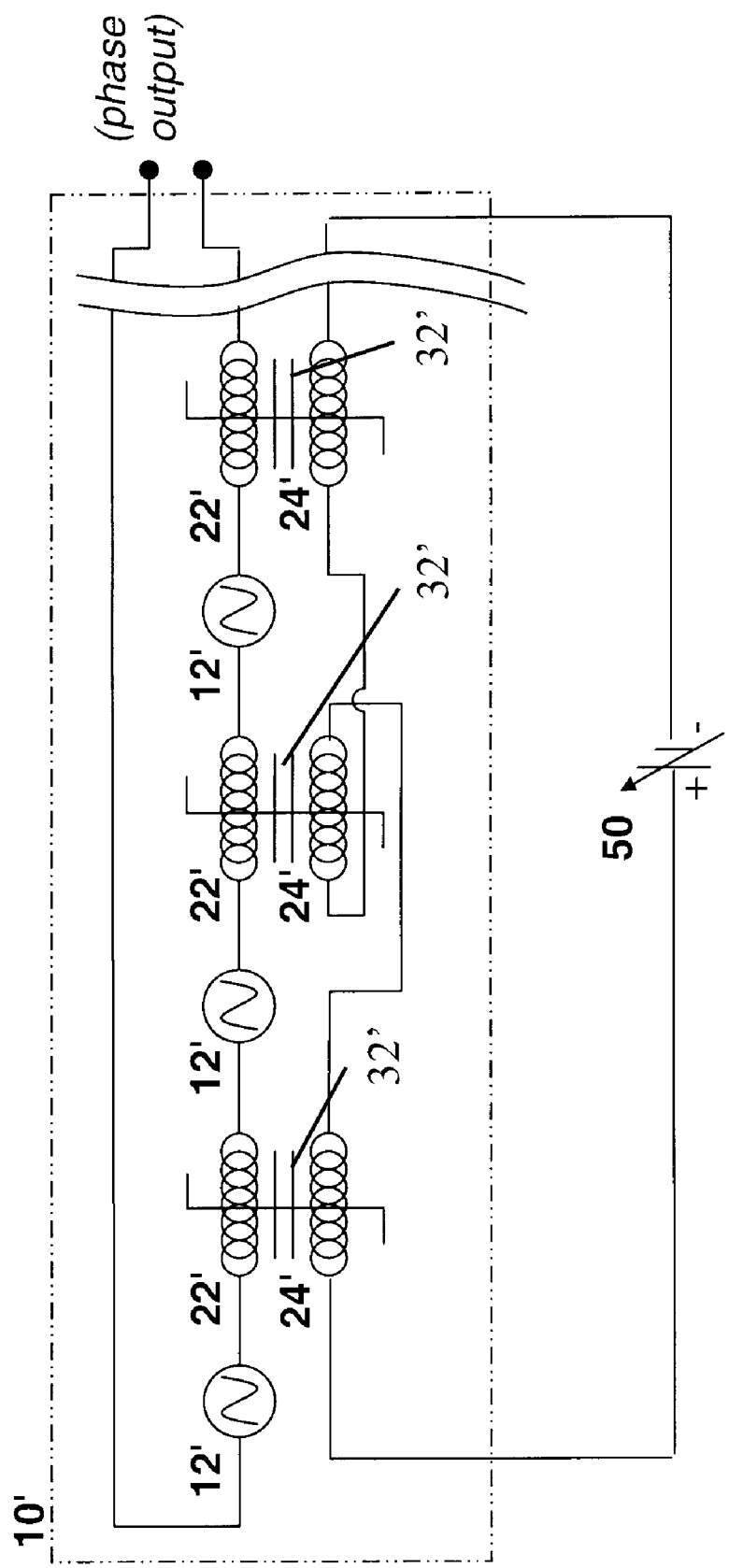
FIG. 3 is a schematic of a partial equivalent circuit of the alternator/motor of FIG. 2, illustrating its functional aspects.

Referring to FIG. 3, alternator/motor 10 as just described can also be represented schematically by an equivalent circuit 10' having a plurality of alternating current sources 12' (i.e. each, equivalent to the moving magnetic rotor system in conjunction with the portion of a power winding 22 located in slot portions 28a) connected to a plurality of power inductors 22' (i.e. equivalent to the portion of the primary winding 22 located in the slot portion 28b), the current sources 12' and power inductors 22' arranged alternately in series. Associated with power inductors 22' are a plurality of control inductors 24' (i.e. equivalent to control winding 24) having saturable cores 32' (equivalent to the saturable control flux bus 32). Control inductors 24' are connected to a variable DC current source and control system in this example, represented by 50, as will be described further below. Therefore, one can see that primary winding 22, control winding 24 and control flux bus 32 co-operate in the present invention to provide an saturable core inductor on-board the stator 12. Saturable core inductors are known to be useful in the regulation of AC power, and in one aspect the present invention provides an integrated approach to implementing a regulation scheme of this generic type, as will be further described.

Referring again to FIG. 2, in use, in a alternator mode rotor 12 is moved relative to stator 20, and the interaction of magnets 14 and power windings 22 creates a primary magnetic flux within PM machine 10 along a primary magnetic flux path or magnetic circuit 60. The primary flux induces a voltage in the power winding, which when an electrical load is connected results in an induced current, and the induced current causes a secondary magnetic flux to circulate an adjacent secondary magnetic flux path or magnetic circuit 62. The secondary magnetic circuit 62 is remote from, and for the most part isolated from the rotor and primary magnetic circuit 60. (it is to be understood that this description applies only to phase "1" of the described embodiment, and that similar interactions, etc. occur in respect of the other phases) The skilled reader will appreciate in light of this disclosure that it may be desirable in many situations to include a regulation apparatus to maintain a minimum current in the power winding during no-load conditions.

Primary magnetic circuit 60 includes rotor 12, rotor air gap 34, power flux bus 36 and the portion of stator teeth 30 between rotor 12 and power flux bus 36. Primary magnetic circuit encircles a portion of power winding 22 and, in use as an alternator causes a current flow in power winding 22. Secondary magnetic circuit 62 includes power flux bus 36, control bus 32 and the portion of stator teeth 30 between control bus 32 and power flux bus 36. Secondary magnetic circuit encircles the portions of the power winding 22 and control winding 24 in slot 28b. Power flux bus 36 divides slot 28 into two slot portions or openings 28a and 28b, with one opening 28a for the power winding only, and another opening 28b for the power and control windings. The primary magnetic circuit encircles an opening 28a while the secondary magnetic circuit encircles an opening 28b. Opening 28a is preferably radially closer to the rotor than opening 28b, Power flux bus 36 is common to both the primary and secondary magnetic circuit paths in this embodiment, however as discussed further below the power flux bus may be separate from the upper portion of the secondary flux path along the direction of flux lines so that the secondary magnetic circuit does not share any common stator portions with the primary magnetic circuit.

A tertiary magnetic circuit 64 preferably circulates around control bus 32, as partially indicated in FIG. 2 (i.e. only a portion of the tertiary circuit is shown as in this embodiment the tertiary circuit circulates the entire stator). The control flux bus 32 is preferably common to both the secondary and tertiary magnetic circuit paths. As mentioned, at least a portion of control flux bus 32 is selectively magnetically saturable, as described further below.

When operated as an alternator, the present invention permits the output of the power winding(s) 22 to be controlled through a manipulation of current supplied to control winding (s) 24, as will now be described.

As explained above, the equivalent power inductor 22' is formed by the portion of the power winding 22 in slot 28b and the secondary magnetic circuit 62, as schematically represented by the equivalent circuit of FIG. 3. The control winding 24 shares the secondary magnetic circuit, however since it is preferably wound in the same direction as the power winding 22 in each slot, as mentioned above, the effect achieved is similar to that provided by alternatingly reversed saturable inductors, and there is preferably substantially no net voltage generated within the control winding 24 by flux in the secondary magnetic circuit.

The application of a DC current from the source 50 to the control winding 24 results In a DC flux circulating circuit 64 in the control flux bus 32. At the instant in time depicted in FIG. 2. It can be seen that the DC flux in tertiary magnetic circuit 64 in the control flux bus 32 is in the same direction in slot A as the AC flux in secondary magnetic circuit 62, but in slot D the direction of the DC flux in tertiary magnetic circuit 64 in the control flux bus 32 is opposite to the AC flux in secondary magnetic circuit 62. As the DC current is increased in the control winding 24, the flux density in the control bus 32 is increased such that the saturation flux density is eventually reached, It will be understood that saturation is reached first in the regions in the control bus where the AC flux and the DC flux are in the same direction, and that at higher DC control currents both regions of the control bus become saturated regardless of flux direction. Once saturation occurs, the AC flux in the secondary magnetic circuit due to the current in the power winding, is very significantly reduced.

As mentioned, the control winding pattern relative to the power winding preferably results in a near net zero voltage induced in the control winding, which simplifies control. Also, since the DC control current through both control flux buses 32 produces magnetic fluxes in different directions relative to the power winding 22, one bus 32 will saturate more in one half-cycle of the AC power while the other bus 32 will saturate more in other, thus tending to equalize the control action through each half-cycle.

Once saturated, magnetic materials substantially lose their ability to conduct magnetic flux, and as such appear to be non-magnetic to both AC magnetic forces ($H_{AC}$) and further changes in DC magnetic influence ($H_{DC}$). The net effect of this saturated condition in the control bus 32 is thus to virtually eliminate the inductance (or impedance) due to the secondary magnetic circuit, which thereby significantly reduces inductance (or impedance) of the machine.

Furthermore, as the current flow in the power winding 22 increases, for example due to an increase in the external load or an increase in the generated output voltage due to an increase in operating speed: the portion of the control flux bus 32 in which the flux directions are instantaneously opposing will become less saturated, which causes a proportional increase in the inductance. This effect tends to cause the output current to remain somewhat constant. Thus the present invention causes the power output current of the alternator to become a function of the control current. The maximum inductance of the equivalent power inductor 22' formed by the secondary magnetic circuit is related to the physical dimensions and materials of the portions carrying the secondary magnetic circuit. The power winding current limit is related to the current in the control winding by:

$$IP*Np+K=IC*Nc$$

where: Np and Nc are the number of turns in the power and control windings, respectively, IP and IC are the currents in the power and control windings, respectively, and K is a constant which is inversely proportional to the maximum inductance of the power winding and other machine design features.

This permits manipulation of the output of power winding 22, and thus control winding 24 may be used as a source of control of PM machine 10. Means for controlling the operation of PM machine are thus available within the machine itself, as the "control" current may be generated by the PM machine 10 power windings, typically in conjunction with rectifiers. In some instances therefore, no external source of control current may be required in conjunction with an electronic current control, although arranging the control winding in series with the rectified output current may also be used to control current to some extent. The novel architecture of the present invention therefore lends itself to many novel possibilities for control systems for the machine, a few examples of which will now described.

For example, the output (i.e. from a power winding 22) of alternator 10 may be controlled by connecting control winding 24 to a power supply 50, and a current applied to the control winding preferably sufficient to fully saturate the control flux bus 32, such saturation being caused by magnetic flux flowing along tertiary path 64 induced by current passing though control winding 24, which is wrapped around control flux bus 32 in this embodiment. When saturation occurs, flux around the secondary magnetic circuit 62 is effectively eliminated, and the magnetic relationship between the power windings and the secondary magnetic circuit is such that inductance in the power winding is virtually eliminated. Thus, more current is permitted to flow in the power winding. Therefore, the current level provided by controlled current source supply 50 can be continuously varied, as required to regulate the output current of the power windings (and thus, ultimately, output voltage) over a range of rotor speeds and electrical loads. In order to effect constant output voltage control, for example, a feedback control circuit is used by the control system of source 50 to compare the alternator output voltage (i.e. the output of power winding 22) to a fixed reference (e.g, representative of a desired output voltage level(s)), and control can be configured such that, when the alternator output voltage is less than a desired reference level, a command is provided to increase the control current to increase saturation level and therefore output current, and thus voltage. Likewise, when the alternator output voltage is above a desired reference value (which may or may not be the same reference value mentioned above), a command is similarly provided to reduce the control current to decrease saturation level and therefore output current, which ultimately permits output voltage control as well. In this way, the output voltage of the alternator can be regulated.

In another control method, if no current is supplied to control winding 24, the output of power winding 22 is reduced and may be by design, limited by the construction of the machine such that the machine's impedance is sufficient to limit short circuit currents to that which the machine may comfortably handle without damage (i.e. the short circuit current is low enough that it would not, for example, pose a danger such a machine overheating, etc.). In this respect, the present invention operates in a similar manner reminiscent of the "fusible-secondary" embodiment of the applicant's U.S. Pat. No. 6,965,183.

Many other control schemes are also possible, including the modulation of the control current (i.e. the current in control windings 24) control with a rapidly varying current so as to cause cyclic amplitude modulation of the alternator output, thereby resulting in the generation of new output frequencies (or side bands) which are different from the raw frequency of the machine (i.e. speed times pole pair frequency of the alternator).

Magnetic flux preferably circulates the tertiary magnetic circuit 64 in the same direction around the control flux bus 32. As mentioned above, although the control winding is provided in the slots corresponding to a particular phase of the three-phase machine described, the power windings are wound in the opposite direction in each slot which is due to the opposite polar arrangement of the magnets 14 associated with each adjacent slot of the phase. To ensure that a uniform direction for the tertiary magnetic circuit 64 is provided, as mentioned the control windings are preferably wound in the same direction in all slots. Also as mentioned, a net-zero voltage is induced in control windings 24, which is desirable because a relatively low DC potential is required to provide DC control currents, thus no special considerations are required to remove a significant AC potential on the control winding.

Figure 5:
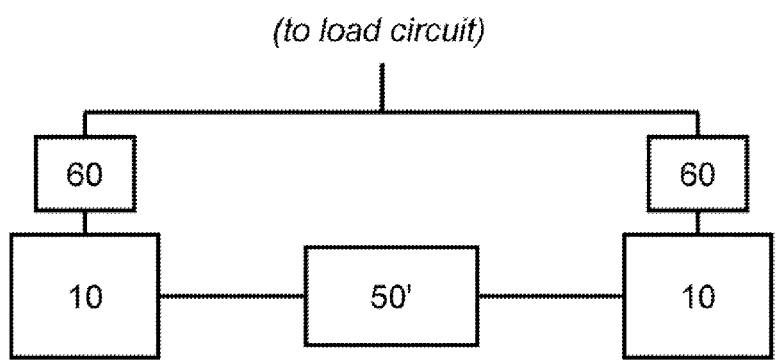
FIG. 5 is a block diagram schematically illustrating another aspect of the present invention.

The present invention also advantageously permits load to be shared between a plurality of alternators/generators. The control winding controls the output current of the machine. Thus, referring to FIG. 5, if several alternators 10 are connected to simple rectifiers 60, the output of the rectifiers can be directly connected together such to feed a common load circuit. Each alternator's contribution to the load current is set by control of the DC current (in this example) provided to each alternator from controlled source 50'. In this way, if a single alternator should fail or be shut down, a control system integrated in 50 can sense this and provide a seamless sharing of load by increasing the current contribution of one or more of the remaining alternators to preferably make up the deficit from the failed or shut down alternator.

Figure 6:
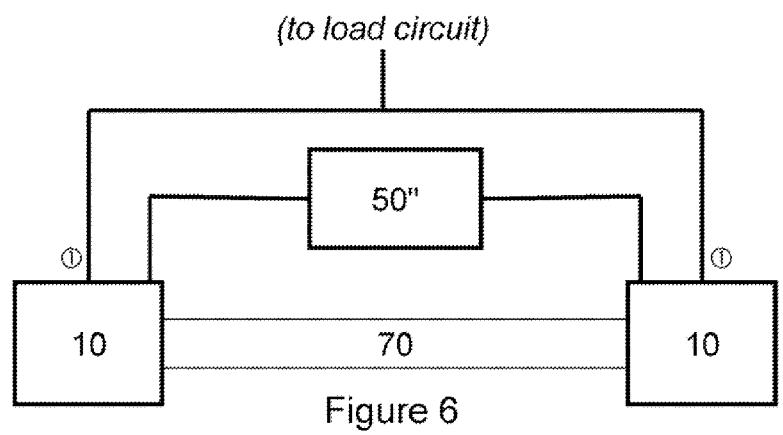
FIG. 6 is a block diagram schematically illustrating another aspect of the present invention.

It is also possible with this invention to connect properly phased alternators 10 directly together such that the AC output of a plurality of alternators 10 having matched phases (e.g. phase "1", as described above) can be parallely connected, as shown in FIG. 6. Current sharing control is provided through control system 50" which also adjusts the control current in each alternator as described above, This can lead to certain advantages of mechanical arrangements when the maximum diameter or shaft length of a single machine must be maintained below a particular value for, say, rotor dynamic or other reasons. In this way, two smaller machines 10 on a single shaft 70 for example, can provided a sufficiently large power output to a larger shared common load circuit.

In both of the above examples, this permits a much simpler means by which power may be shared, and does not require the complicated control systems of the prior art. This feature may be used advantageously, as well, in a "dual channel" electric machine, as described in applicants U.S. Pat. No. 6,965,183. Referring again to FIGS. 5 and 6, for example both machines 10 can be integrated in to a single rotor-stator assembly in accordance with the teachings of the mentioned patent. That is, distinct winding sets, corresponding to each functional "machine" are disposed within distinct, non-overlapping sectors of a common stator, and connected to independent electronics (e.g. power conditioning electronics in the case of machine 10 used as an alternator, or motor drive electronics in the case of a machine 10 used as a motor). Distinctly controllable machine "channels" according to the present teachings are thus provided within a single stator structure.

In another embodiment, as discussed above, primary flux bus 36 may be provided with a low Curie point materials in accordance wit the applicant's co-pending application incorporated above., so as to provide thermal protection in the event that a fault causes normal operating temperatures to be exceeded.

Control schemes such as those disclosed above may be employed individually or may be combined as desired to permit several control features to exist contemporaneously within the PM machine. As prior art fixed-geometry PM machines typically are not controllable in any way other than by the speed at which they are operated, this controllability feature of the present invention is of significant value to the PM machine designer, particularly in those applications where the rotational speed of the machine cannot itself be used to control machine output. The present invention also offers a robust and reliable design suitable for aerospace applications. The power-sharing opportunities offered by the present invention also cannot be ignored.

Figure 4:
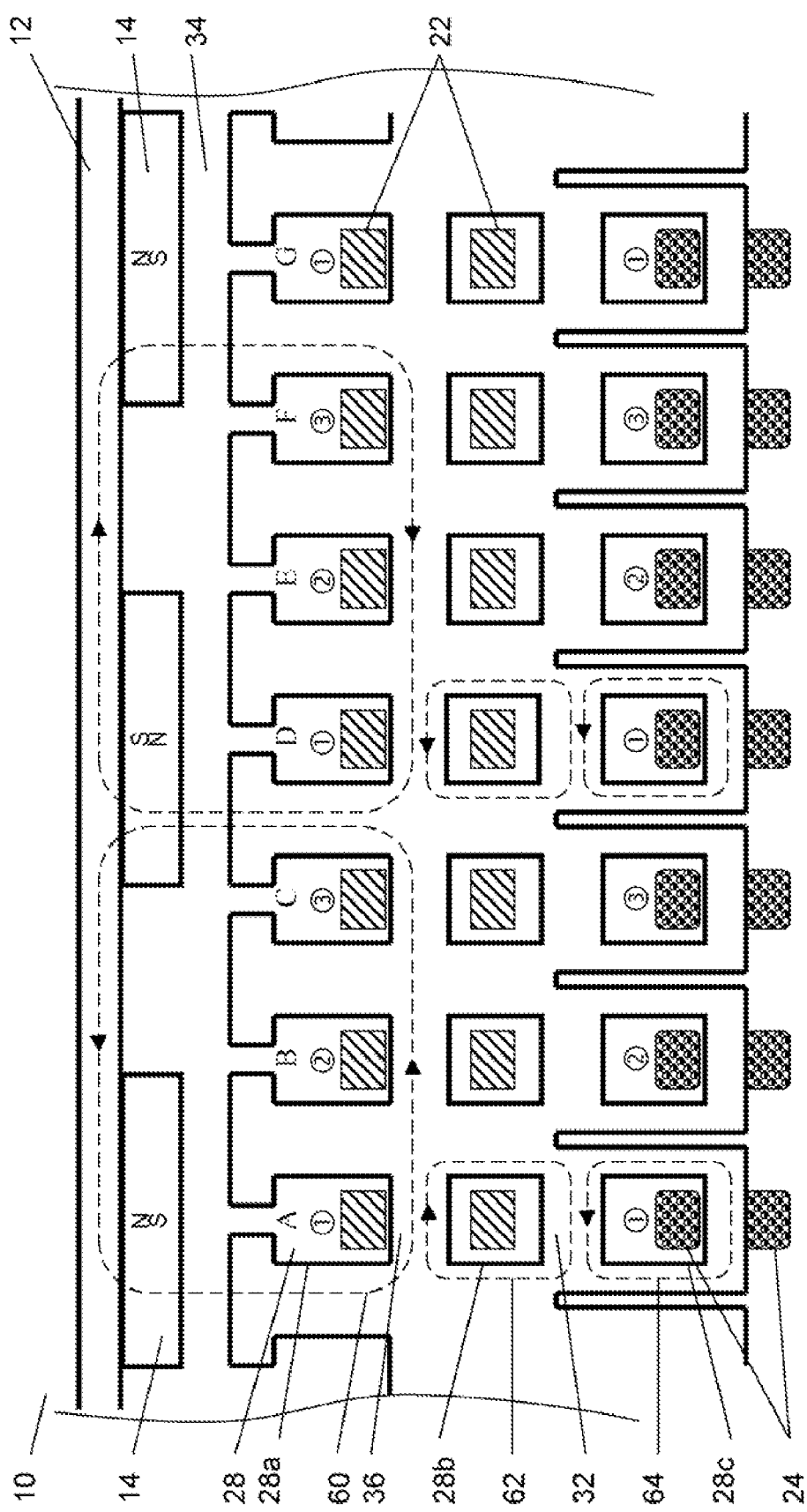
FIG. 4 is similar to FIG. 2, but depicting another embodiment of the invention.

In another embodiment, shown in FIG. 4, the control winding 24 is provided in a separate closed slot 28c adjacent to the closed slot portion 28b. The secondary magnetic circuit 62 and tertiary magnetic circuit 64 share the control flux bus 32. Reference numerals in FIG. 4 use the same numerals to denote elements similar to those of FIG. 2 and described above. The same is also true of the embodiments of FIGS. 7-12, as will now be discussed, The skilled reader will appreciate that as the elements of the various embodiments are discussed, only those needed to enable understanding by the skilled reader will be discussed, and that those elements having similar function to the embodiments described above need not be discussed further.

Figure 7:
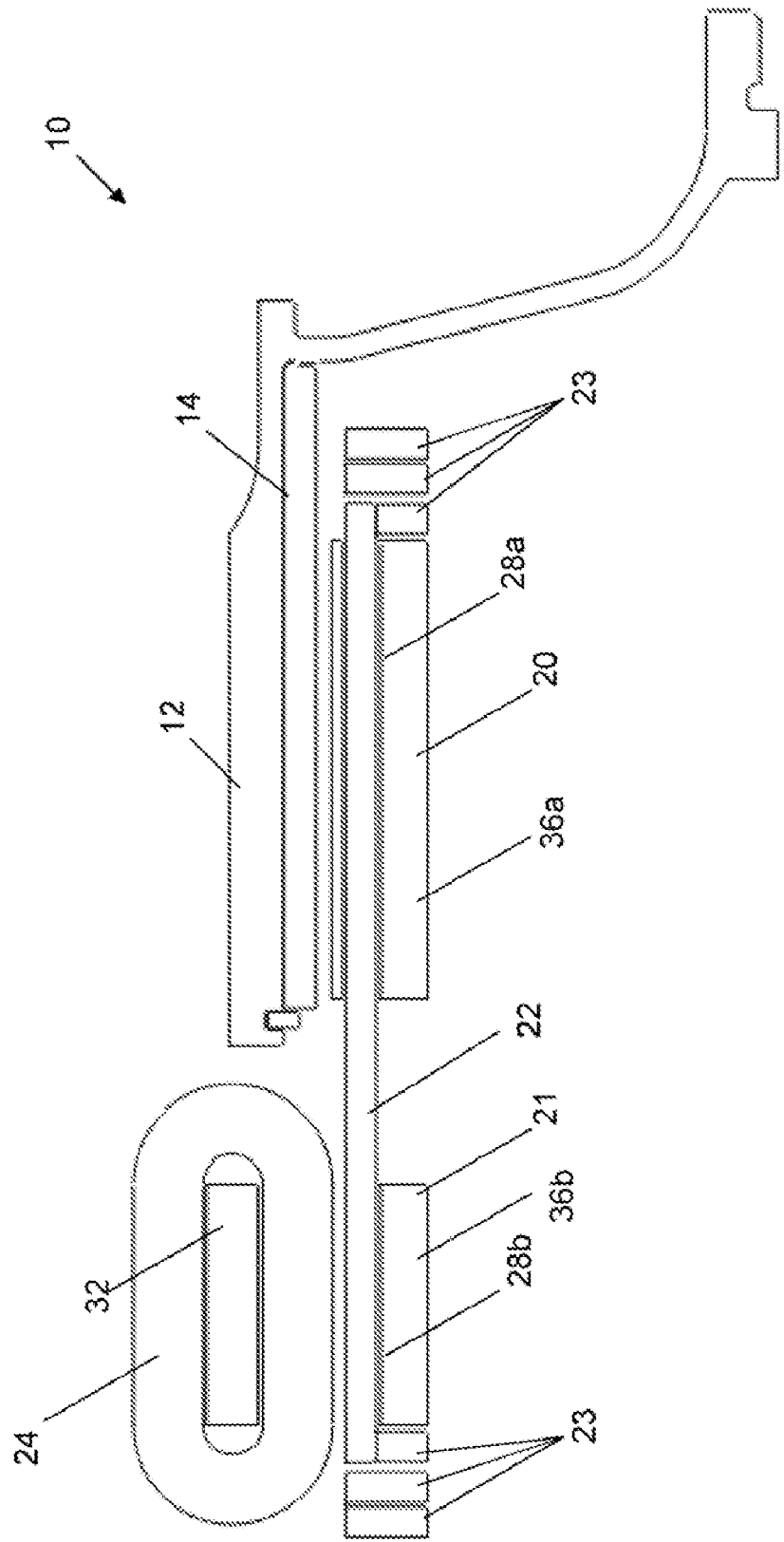
FIG. 7 depicts another embodiment of the invention.
Figure 8:
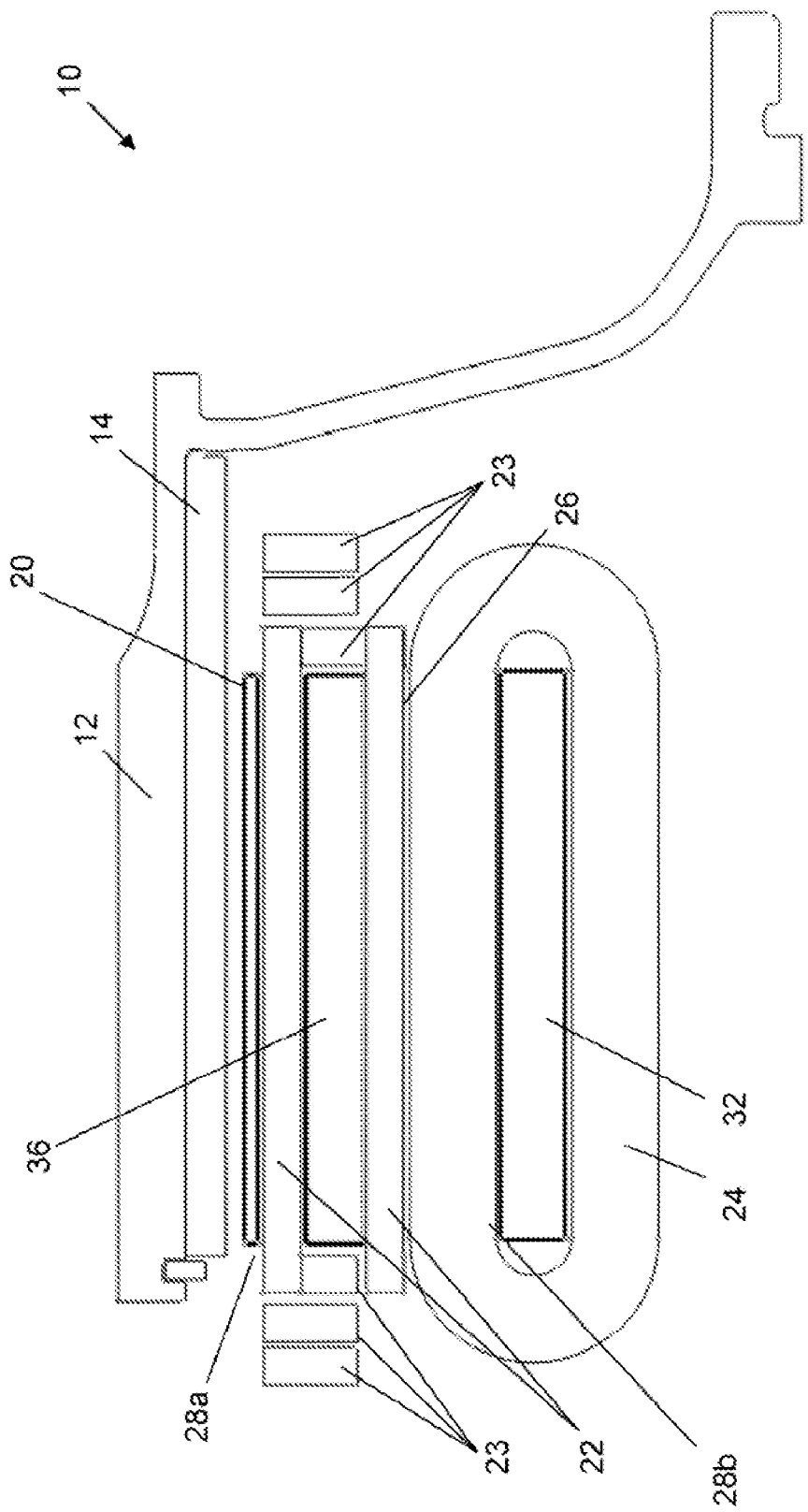
FIG. 8 is a cross-sectional view of the embodiment of FIG. 2, taken along the line 8-8 in FIG. 2.

In the embodiment of FIG. 7, the control winding 24 is located within slots 28b provided in a separate stator 21, which is preferably but not necessarily positioned concentrically with stator 20. While control winding 24 is depicted schematically as a monolithic annulus in FIG. 7, is it preferably a multiple-turns wound conductor, as described above, connected to a suitable power source (not shown in this Figure), Power winding 20 is positioned within slots 28a and 28b, and thus extends between stator 20 and stator 21. Power winding end turns 23 join the conductors of adjacent slots (the embodiment of FIG. 7 has three sets of power windings 22—only one of which is shown—with one winding set corresponding to each phase of a three-phase system, and hence three sets of end turns 23 are depicted in FIG. 7, the innermost set corresponding to the power winding 22 depicted, while the others correspond to adjacent phases which are not depicted). Stator 21 provides control flux bus 32, while power flux bus 36 is provided in two portions—portion 36a in stator 20 and portion 36b in stator 21. Power flux bus portion 36a forms part of primary magnetic circuit 60, while power flux bus portion 36b forms part of secondary magnetic circuit 62. Control flux bus 32 provides a portion of secondary magnetic circuit 62 and tertiary magnetic circuit 64, as before. Stator 21 is supported in any suitable manner, such as through integration with stator 20 (not shown), through supports (not shown) mounted to stator 20 or other suitable foundation, or simply through the intrinsic supported provided by power windings 22 themselves, preferably in conjunction with suitable means (not shown) to impede unwanted vibration, etc. For comparison purposes, FIG. 8 shows a view similar to FIG. 7 of the embodiment of FIG. 2. The embodiment of FIG. 7, relative to that of FIGS. 2 and 8, permits independence of stator length and material between stators 20 and 21, and permits flexibility in providing machine 10 within an available space envelope. As well, the configuration of power windings 22 is somewhat simpler, in that additional looping of power winding 22 is not present. As well, the control winding 24 may be placed outside the circumference of stator 20, without interfering with the operation of rotor 12. The stator 21 need not be physically adjacent stator 20 at all, but preferably is for reasons of compactness, efficiency, etc.

Figure 9:
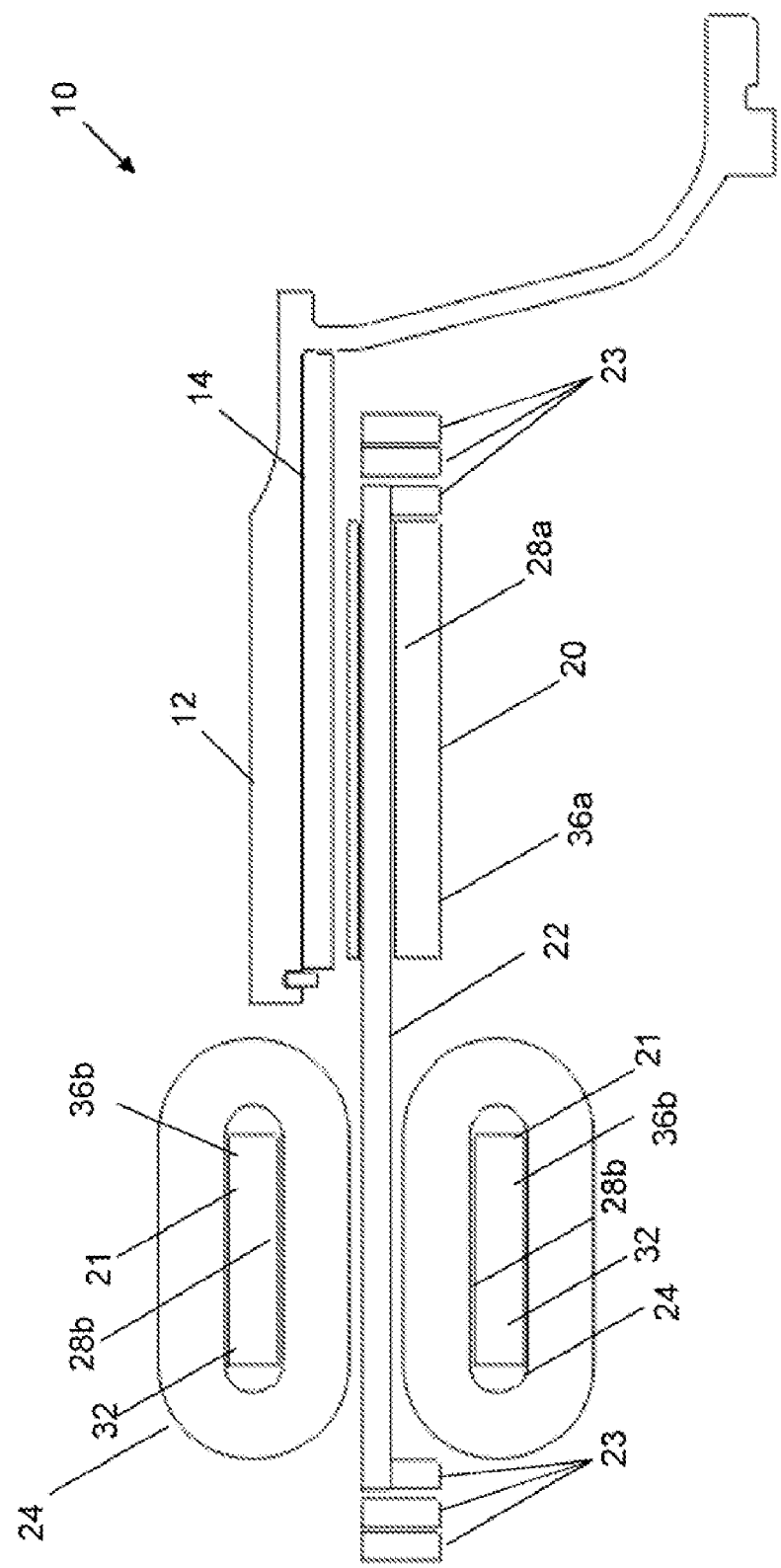
FIG. 9 is view similar to FIG. 8 of another embodiment of the invention.
Figure 10:
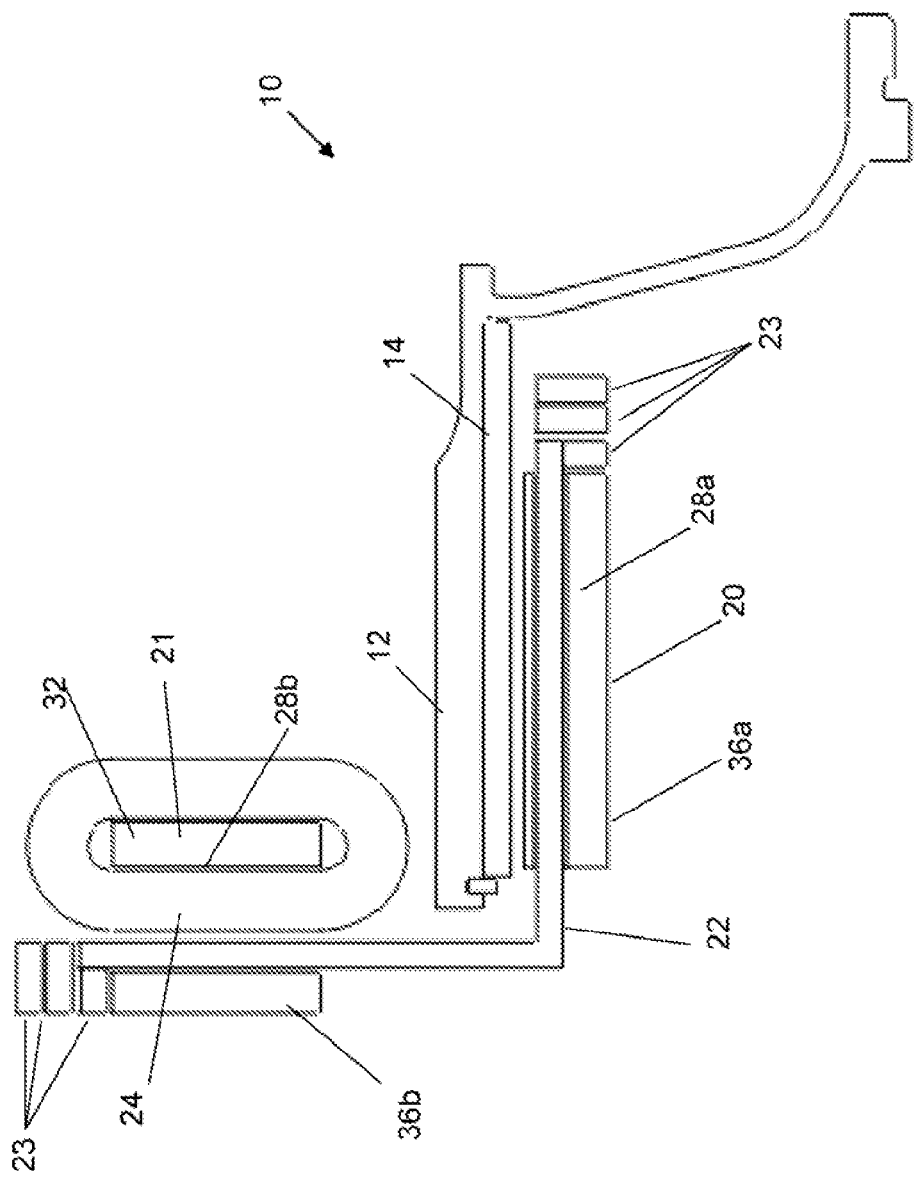
FIG. 10 is view similar to FIG. 8 of another embodiment of the invention.
Figure 11:
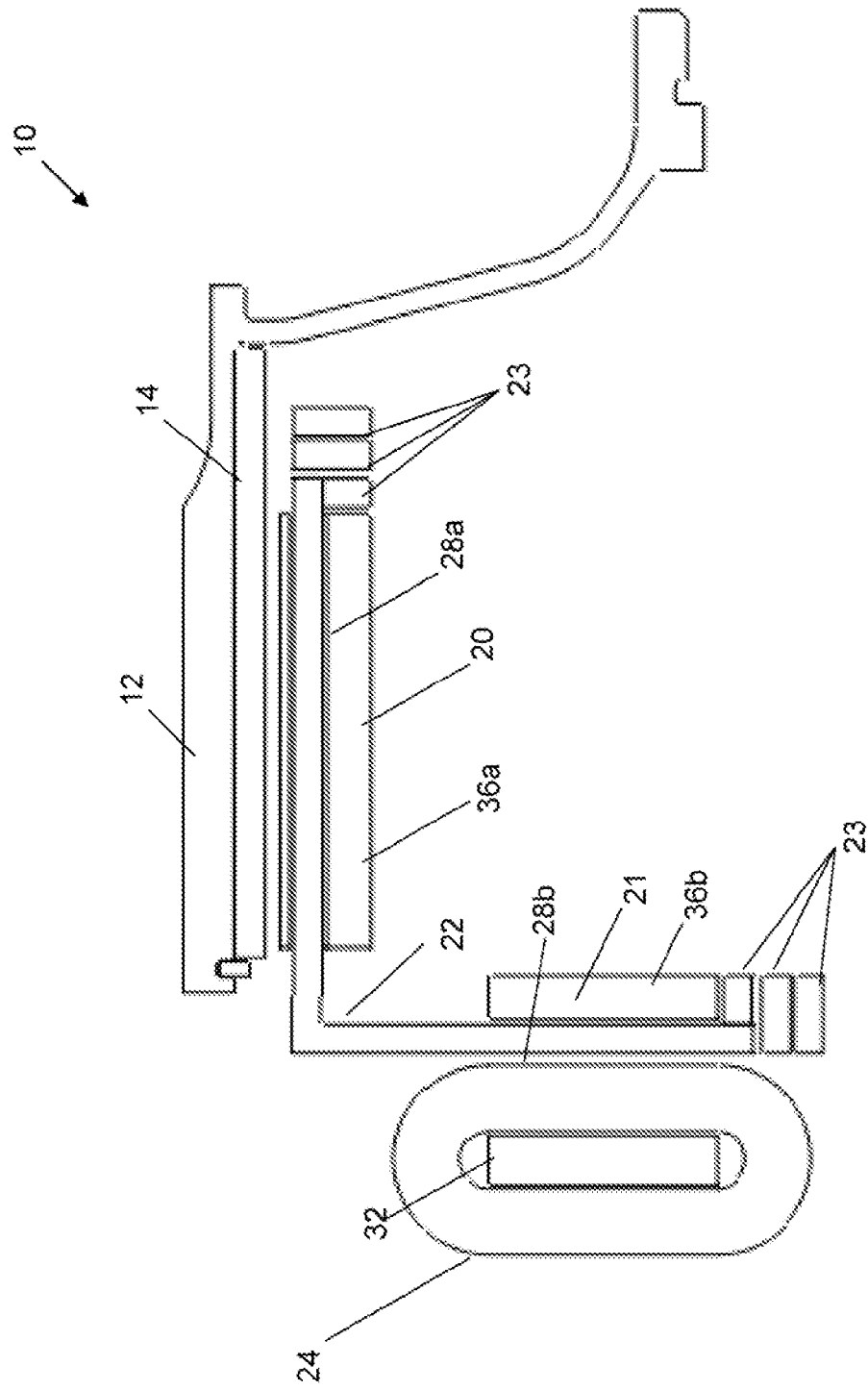
FIG. 11 is view similar to FIG. 8 of another embodiment of the invention.

Referring now to FIGS. 9 to 11, various embodiments are shown employing stators 20 and 21. In FIG. 9, the saturation apparatus includes a plurality of control windings 24, one disposed on each side of power winding 22, connected to suitable electrical source or sources, and which may be independently controlled if desired FIGS. 10 and 11 demonstrate a few examples of options for placing components, to demonstrate the flexibility provided to meet a pre-specified envelope for machine 10. A myriad of other examples will be apparent to the skilled reader, as well. The stator 21 need not be aligned with nor adjacent stator 20, nor have any resemblance whatsoever to the appearance of stator 20.

Figure 12:
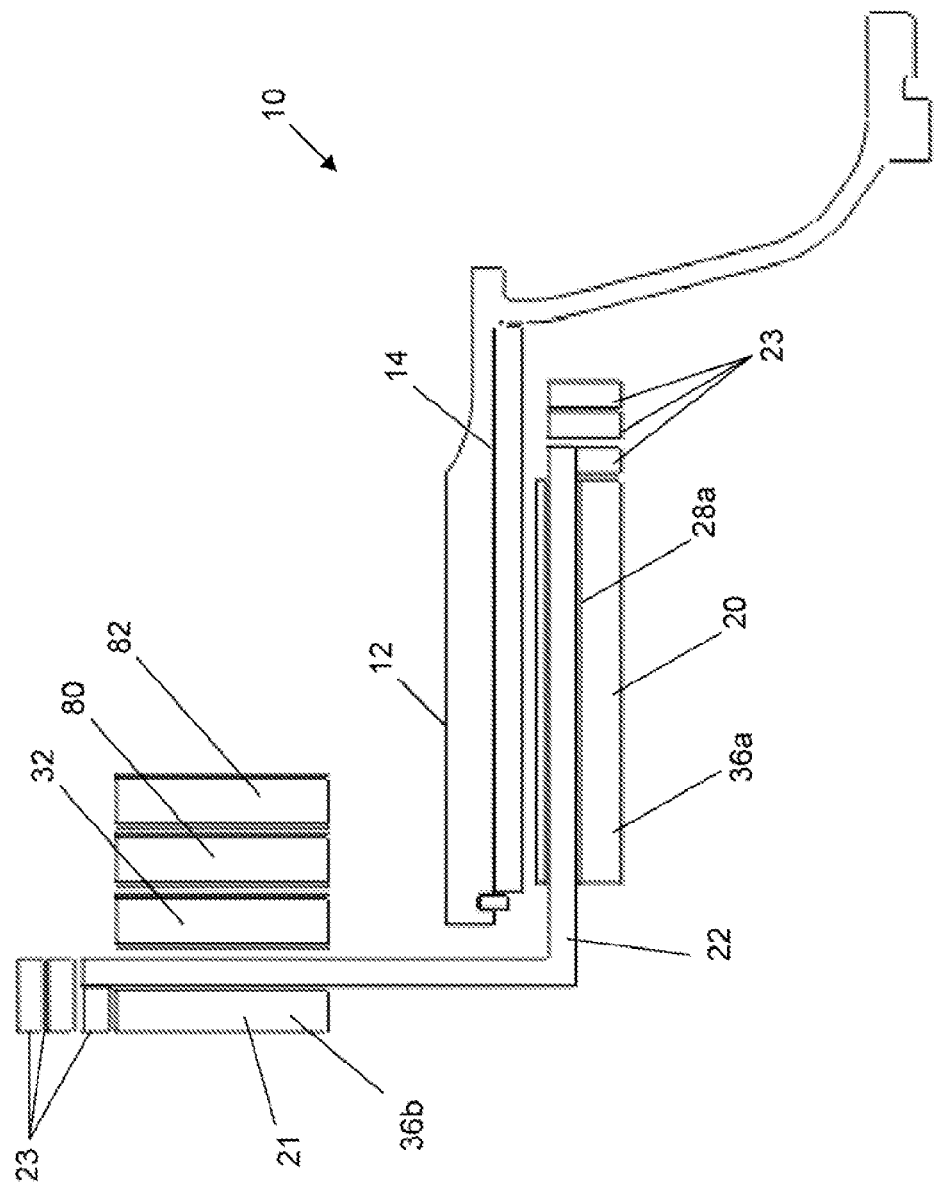
FIG. 12 is view similar to FIG. 8 of another embodiment of the invention.

In another embodiment, depicted schematically in FIG. 12, rather than rely on an electromagnetic saturation control apparatus, including a control winding 24 and controlled current source 50, for saturation control as described above, the control flux bus may be saturated instead with a saturation assembly comprising one or more suitable permanent magnets 80 brought into close proximity to the control flux bus 32 by an appropriate control and actuation system (not shown), which may be mechanical, electrical, electronic or otherwise, or combinations thereof. For example, permanent magnets 80 are mounted on a support 82, which is controllably moveable, such as through rotation, reciprocation, vibration or other movement, so as to permit the magnets to periodically vary a saturation level of the control flux bus to appropriately control power winding 22 as described above. The frequency of saturation is adjusted through control of the speed and movement of the moving magnets 80. This permanent magnetic saturation assembly eliminates the need for an electromagnetic assembly with control winding 24 and its associated circuitry.

The present invention may also be used for electric motor control purposes. For example, when used as a starter motor, the present invention may be used to vary the impedance of the motor and thereby control current transients experienced during motoring, the torque speed relationship can also be adjusted to some degree using the control winding, since the phase angle between the rotor mmf and the armature mmf are variable due to the variable inductance of the power winding. Similarly, other modes of control are possible for alternators/generators, as well. For example, as briefly mentioned above, varying or modulating the saturation level appropriately may be used to control the frequency of output alternating current in the power windings by variably shifting the generated frequency, as the alternator speed is varied, so as to provide a desired constant output frequency. This may be done using amplitude modulation techniques such that the alternator output frequency consists of two or more frequency components (i.e. sum and difference frequencies or sidebands). Appropriate filtering, subtraction or detection of one of the frequencies will result in a new single output frequency which is related to the sum or difference between the alternator frequency and the control frequency. Active rectification of the envelope of a modulated alternator output could also be used to provide a new power frequency.

The above description is meant to be exemplary only, and one skilled in the art will recognize that changes may be made to the embodiments described without department from the scope of the invention disclosed. For example, the number of phases in the motors could be varied and could be to any number. The motors may be single or multi-phase, single or multi-channel. The windings may have single or multiple turns per slot, the number of turns of a winding not necessarily has to be a whole number. The number of phase windings does not necessarily have to equal the number of control windings, and one or more windings may perhaps be present in a slot. The windings may be any conductor(s) (i.e. single conductor, more than one wire, insulated, laminated, Litz etc.) or may be superconductors. In multiphase machines, there may be delta or Y-connected windings in accordance with suitable techniques. There need not be an air gap between the power and control windings, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and those described above need not be used at all, or throughout the apparatus. Also, the magnetic circuits described can be arranged in the stator (and/or rotor) in any suitable manner. Any suitable stator configuration may be used, and the stators depicted are exemplary only. The stator need not be slotted as shown, nor slotted at all. The arrangement of the primary, secondary and tertiary magnetic circuits, and the arrangement of phase winding saturation apparatus(es) in the machines may be any suitable arrangement. Likewise, the stator and rotor may also have any suitable configuration. Although DC is preferred in the control windings 24 of the machine, any suitable saturating arrangement may be used. Any suitable machine control arrangement may be employed. The present technique may also be employed with stand-alone motors if desired, and redundant systems are not required, but merely one apparatus arrangement which may benefit from the application of the above principles. Still other modifications which fall within the scope of the present invention will be apparent to those skilled in the art, in light of a review of this disclosure, and such modifications are intended to fall within the appended claims.

Still other modifications which fall within the scope of the present invention will be apparent to those skilled in the art, in light of a review of this disclosure, and such modifications are intended to fall within the equivalents accorded to the appended claims. In this application, it is to be understood that the term 'alternator' is used sometimes used generically to mean a device used for generating electricity, and is not always intended therefore to be limited to a device for generating an output alternating current.

What is claimed is:

1. A method of regulating operation of an electrical machine, the method involving a plurality of electric machines, each machine having a magnetic rotor, a stator and at least one stator winding, the winding associated with a primary magnetic circuit defined by the rotor and stator, the winding also associated with a secondary magnetic circuit defined in the stator, the secondary magnetic circuit remote from the first magnetic circuit and including a magnetically saturable portion, the method comprising the steps of:

operating each machine to provide at least one of generated output electrical power in the winding and motive power as a result of current supplied to the winding;

controllably varying a saturation level of a portion of the secondary magnetic circuit to thereby control operation of each machine;

monitoring the output of each machine for at least one criterion indicative of a fault condition existing in a deficient machine resulting in an associated power decrease;

controllably varying a saturation level of at least one non-deficient machine to compensate for said power decrease.

2. The method of claim 1, wherein said associated power decrease is due to at least one of a failure and shut down of the deficient machine.

3. The method of claim 1, wherein in at least one of the machines, the stator comprises a first stator portion and a second stator portion, and wherein the magnetic rotor rotates adjacent the first stator portion and the saturation level is controlled adjacent the second stator portion.

4. The method of claim 3, wherein the first and second stator portions are disposed axially beside one another relative to a common axis of the stator portions.

5. The method of claim 3, wherein the stator portions are distinct components relative to one another.

6. The method of claim 1, wherein the step of controllably varying the saturation level includes providing electric power from a power source to an electromagnetic saturation assembly.

7. The method of claim 1, wherein the magnetic rotor of each machine includes at least one permanent magnet.

* * * * *